United States Patent [19]
Birkholz et al.

[11] Patent Number: 5,663,227
[45] Date of Patent: Sep. 2, 1997

[54] RELEASE AGENT FOR LINERLESS PRESSURE SENSITIVE POSTAGE STAMPS

[75] Inventors: Ronald B. Birkholz, White Bear Lake; Mark E. Schwartz, Mahtomedi, both of Minn.

[73] Assignee: United States Postal Service, Washington, D.C.

[21] Appl. No.: 615,443

[22] Filed: Mar. 14, 1996

[51] Int. Cl.⁶ .................................................. C08K 3/26
[52] U.S. Cl. .................... 524/262; 524/269; 524/506; 524/788; 524/425; 524/864; 524/868; 525/103; 428/418
[58] Field of Search ................ 525/103; 524/506, 524/868, 864, 269, 425, 788, 262; 428/41.3, 41.4, 41.8

[56] References Cited

U.S. PATENT DOCUMENTS

| | | | |
|---|---|---|---|
| 2,532,011 | 11/1950 | Dahlquist et al. | 428/41.3 |
| 2,607,711 | 8/1952 | Hendricks | 428/41.3 |
| 3,967,031 | 6/1976 | Lambert | 428/294 |
| 4,587,156 | 5/1986 | Wu | 428/207 |
| 4,599,260 | 7/1986 | Truskolaski et al. | 428/207 |
| 4,895,747 | 1/1990 | Birkholz et al. | 428/42 |
| 5,032,460 | 7/1991 | Kantner et al. | 428/449 |
| 5,061,535 | 10/1991 | Kreckel et al. | 428/42 |
| 5,089,336 | 2/1992 | Kumar et al. | 428/352 |
| 5,154,962 | 10/1992 | Mertens et al. | 428/40 |
| 5,290,615 | 3/1994 | Tushaus et al. | 428/40 |
| 5,296,279 | 3/1994 | Birnbaum et al. | 428/42 |
| 5,496,635 | 3/1996 | Francis et al. | 428/352 |

*Primary Examiner*—Ralph H. Dean
*Attorney, Agent, or Firm*—Kenneth D. Ross, Esquire

[57] ABSTRACT

An improved release agent for linerless pressure sensitive postage stamps, comprising a low adhesion backsize, preferably organo polysiloxane polyurea block copolymer, as disclosed by Tushaus, et al. (U.S. Pat. No. 5,290,615), containing therein a dispersion of calcium carbonate in the range of 2 to 7 percent by weight, and polyvinyl pyrrolidone in the range of 4 to 10 percent. The combined level of both additives to said low adhesion backsize is about 8 to 12 percent. The preferred levels of each additive are: polyvinyl pyrrolidone at 4 percent and calcium carbonate at 4 percent, to achieve a desired minimum drying time for cancellation ink imposed upon a surface of said release agent.

4 Claims, 1 Drawing Sheet

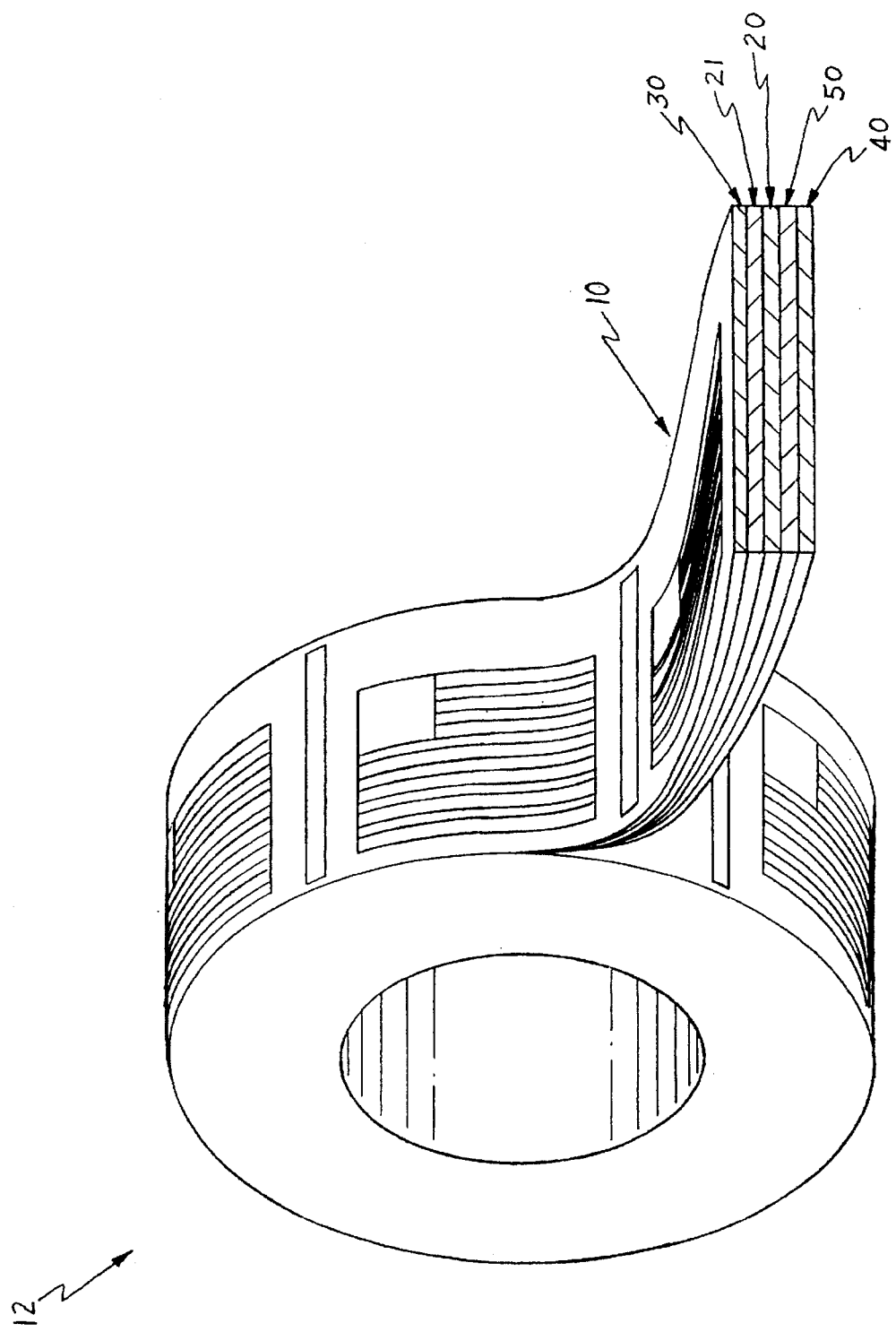

RELEASE AGENT FOR LINERLESS PRESSURE SENSITIVE POSTAGE STAMPS

FIELD OF INVENTION

This invention relates to release agents for coating upper, image-bearing surfaces of linerless pressure sensitive postage stamps.

BACKGROUND

Owing to the increase in pubic demand for pressure sensitive postage stamps, bulk packaging of these stamps has become highly desirable, even essential. Such stamps have heretofore been available in sheets of 10 to 20 stamps held on a removable silicone coated liner, a form that does not lend itself to packaging in bulk. In addition, the silicone-containing liner material poses an environmental burden.

A model bulk packaging configuration for stamps is the currently available roll of 100 conventional stamps: storage space is minimized and the roll is used in its entirety. In order to configure pressure sensitive stamps similarly, however, the image-bearing surface of each stamp must be coated with a release agent which reversibly binds to the pressure sensitive adhesive on the opposing surface of another stamp to hold the roll in place during storage. The release agent easily separates from the adhesive layer as the roll unwinds.

Release agents have been used for many years, and composed of a variety of chemical formulations: urethanes, silicone copolymers, acrylates, acrylate copolymers, fluorocarbon polyamides, some water-borne and other dispersed by organic solvent. The particular properties of each release agent is also highly dependent upon the thickness of deposition and the porosity of the chosen substrate material.

Postage stamps have certain distinct features which impose several restrictions on the selection of a release agent for use with a linerless roll of pressure sensitive stamps. These restrictions result from unique postal handling procedures, including the used of cancellation marks atop the image-bearing surface of each posted stamp. For example, a suitable release agent must adhere securely to the adhesive material, yet be able to separate cleanly from it. On the other hand, the release agent must adhere permanently to the image-bearing surface of each stamp, remaining stable over a wide range of temperatures and humidities. Furthermore, the release coating must be transparent to reveal clearly both the stamp image and the phosphorescence of the stamp paper. Finally, the release coating must accept and retain a legible cancellation mark of glycol-based ink.

A copending application by Birkholz (Ser. No. 08/615,442), pending discloses linerless pressure sensitive postage stamp embodiments utilizing a release agent comprising a silicone-urea block copolymer with calcium carbonate dispersed therein at the level of 3 to 10 percent by weight. The block copolymer, having a preferred average molecular weight of about 4780, is disclosed and claimed in Tushaus, et al. (U.S. Pat. No. 5,290,615). The release agent is deposited upon the stamp paper as a dispersion in isopropyl alcohol, followed by drying to remove the alcohol.

While that formulation of release agent proved adequate for current postal procedures, even further reduction of the drying time for cancellation ink is highly desirable. Thus, an object of this invention was to optimize the formulation of the release agent, especially with regard to drying time of a glycol-based cancellation ink.

SUMMARY OF INVENTION

A synergistic effect on drying time of cancellation ink on release agents used in linerless pressure sensitive postage stamps was achieved by adding both calcium carbonate and polyvinyl pyrrolidone to an organo polysiloxane polyurea copolymer (as disclosed by Tushaus, et al. in U.S. Pat. No. 5,290,615). The preferred levels for these additives are 2 to 7 weight percent calcium carbonate, 4 to 10 weight percent polyvinyl pyrrolidone, and a total level of about 8 to 12 weight percent for the combination of both additives.

BRIEF DESCRIPTION OF THE DRAWING

The FIGURE is a perspective view of a preferred embodiment of linerless pressure sensitive postage stamps, indicating the multiple layers thereof.

DETAILED DESCRIPTION OF THE INVENTION

The accompanying FIGURE depicts a preferred embodiment of linerless, pressure sensitive postage stamps, 10, each of which is attached to adjacent stamps in an end-to-end configuration. The resultant linear aggregate of stamps is coiled into a multi-layered roll, 12. The perspective view of the FIGURE also reveals the laminar composition of each stamp, including a centrally disposed stamp paper, 20, and a stamp image, 21. A release agent, 30, which is the subject of this invention, as described more fully below, is distributed over stamp paper 20 and stamp image 21.

Dispersed on a lower surface of stamp paper 20 opposing stamp image 21 is pressure sensitive adhesive 40 for securely attaching stamp 10 to a desired support surface (not shown), such as a postal envelope. It is desirable that pressure sensitive adhesive 40 form a secure bond with a postal envelope within less than 15 seconds, to avoid misalignment of stamp 10. In addition, it is highly desirable that pressure sensitive adhesive 40 not migrate, or "bleed", beyond the edges of stamp paper 20 during storage. Subject to those restrictions, any pressure sensitive adhesive will suffice, including those proposed by Birkholz and Riter (referring to U.S. Pat. No. Re. 24,906). Particularly desirable adhesives include: synthetic rubber/resin adhesives available from Minnesota Mining & Manufacturing Company, St. Paul, Minn., and a block copolymer of polysiloxane and urea segments, as disclosed by Leir, et al. (U.S. Pat. No. 5,214,119).

Owing to the public interest in collecting postage stamps, it is desirable to include a water dissipative agent 50 interposed between stamp paper 20 and pressure sensitive adhesive 40. In accordance with the disclosure of Birkholz and Riter (U.S. Pat. No. 4,895,747), dissipation of water dissipative agent 50 permits the removal of stamp paper 20, stamp image 21, release agent 30 and any other material (e.g., cancellation mark ink) atop release agent 30 from the support surface without damage. Typically, the support surface can be immersed into water until stamp 10 separates.

Release agent 30 is applied to stamp paper 20 (bearing stamp image 21) as a dispersion in isopropyl alcohol, followed by removal of alcohol through evaporation.

The preferred embodiment of release agent 30 contains a block copolymer of silicone-urea, as disclosed by Tushaus, et al. (U.S. Pat. No. 5,290,615), specifically, organo polysiloxane polyurea block copolymer, with an average molecular weight of about 4780. To said silicone-urea block copolymer is added calcium carbonate, as disclosed in the copending application of Birkholz (Ser. No. 08/615,442), pending, and available as "Albagloss" or "Superflex 200" from the Pfizer Company of Terre Haute, Ind.

During the course of testing potential drying accelerators, it was observed that polyvinyl pyrrolidone ("PVP"), available from GAF Corporation as K-15 or K-30, also promoted the drying of cancellation ink imprinted upon a layer of release agent. Thereafter, the named inventors of this invention observed that the combination of PVP with calcium carbonate was more effective than either additive alone (compared at a constant total level of additives). This synergism between PVP and calcium carbonate was then tested in the same way as was described by Birkholz in the copending application (Ser. No. 08/615,442), pending, to identify the preferred composition of release agent 30.

Release agent formulations were tested by preparing solutions of 15% by weight of silicone urea block copolymer in isopropyl alcohol, into which were dispersed various levels of CaCO3 and/or PVP, the amount of each additive measured as a percent of the total weight of copolymer plus all additives. These test solutions were coated onto Glatfelter 200 stamp paper by means of a flat bed coater, followed by drying at 135 degrees Fahrenheit to yield a finished coating of 1.0 grains per 24 square inches of surface. Portions of each sample were then marked with standard glycol-based postal cancellation ink, USPS 914M23B, at four separate levels (subjectively described as light, moderate, heavy and very heavy). Drying time was recorded, in accordance with U.S. Postal Service procedures, by periodically abrading the marks with a rubber probe, until no smearing of ink was obtained.

An illustrative example of the observed synergism is shown in the following TABLE, which records ink drying times for sample release agent compositions with a total of 12% additives (PVP and/or calcium carbonate) obtained with heavy inking. Similar results were obtained with moderate and light inking.

TABLE

Drying Time for Cancellation Ink (Heavy Level) on Silicone Urea Release Agent with Additives

| % PVP | % CaCO3 | % Total | Drying Time (min.) |
|-------|---------|---------|--------------------|
| 12    | 0       | 12      | 10                 |
| 0     | 12      | 12      | 10+                |
| 6     | 6       | 12      | 6–7                |

Further experiments have shown the preferred level of calcium carbonate to be 2 to 7 percent by weight, and the preferred level of PVP to be 4 to 10 percent. The total of both additives should be about 8 to 12 percent. The most desirable composition was found to be 4.0 percent PVP and 4.0 percent calcium carbonate.

Levels of PVP in excess of 4% in silicone urea release agents were found to have a sensitivity to moisture. That is, when a stamp coated with such a release layer is soaked in water to remove adhesive layer 40, usually for about 15 to 30 minutes, some PVP is extracted from the release agent into the water. The resultant stamp surface takes on an objectionable milky-white appearance.

A further component of a preferred embodiment of this invention is the inclusion of perforated edges between adjoining stamps 10 in the linear aggregate of stamps which is coiled to form roll 12. The purpose of the perforated edges is to simulate the appearance of traditional postage stamps. In rolls of traditional postage stamps, edges between adjacent stamps are defined by cutting a linear sequence of non-adjoining circular perforations to create a linear region of structural weakness. The user may separate stamps manually by applying a shear force, i.e., tearing, along the line of perforations, and structural weakness, thereby leaving a scalloped edge on each of the separated stamps.

Similar circular perforations are not compatible with linerless pressure sensitive postage stamps because of a tendency for release agent, water dissipative agent and/or adhesive to migrate into the circular holes during storage. Accordingly, a preferred embodiment of this invention includes a non-continuous series of curved slits to create a generally linear area of weakness between adjoining stamps, as disclosed in the copending application of Munson (Ser. No. 08/615,444), pending. These slits permit manual separation of stamps with a traditional appearance resulting along the separated edge.

An alternative preferred embodiment of this invention has no cuts whatsoever between adjoining stamps in its roll. In this alternative preferred embodiment, generally useful for bulk quantities, adjoining stamps are automatically severed and affixed to support materials by machine.

It will be apparent to one skilled in the art that forms and embodiments of this invention beyond those expressly set forth herein are necessarily included within the scope and spirit of the present disclosure and appended claims.

We claim:

1. A release agent for covering an upper, image-bearing surface of each of an aggregate of linerless, pressure sensitive postage stamps, said stamps being connected end-to-end and coiled into a roll, with pressure sensitive adhesive of one stamp removably adhering to said release agent stop a stamp in another layer of said roll, said release agent comprising:

(a) an organo polysiloxane polyurea block copolymer with average molecular weight of about 4780;

(b) calcium carbonate dispersed throughout said copolymer: and (c) polyvinyl pyrrolidone dispersed throughout said copolymer, whereby said release agent may accept and retain a glycol-based postal cancellation ink.

2. A release agent as described in claim 1, wherein said calcium carbonate is dispersed within said copolymer at a level of 2 to 7 percent of total weight, and said polyvinyl pyrrolidone is dispersed within said copolymer at a level of 4 to 10 percent of total weight.

3. A release agent as described in claim 2, wherein said calcium carbonate and said polyvinyl pyrrolidone appear at a total combined level of about 8 percent of total weight.

4. A release agent as described in claim 3, wherein said calcium carbonate appears at a level of 4 percent of total weight and said polyvinyl pyrrolidone appears at a level of 4 percent of total weight.

* * * * *